US012012783B2

(12) United States Patent
Yang

(10) Patent No.: US 12,012,783 B2
(45) Date of Patent: *Jun. 18, 2024

(54) UNIVERSAL SECURITY LOCK FOR PORTABLE ELECTRONIC DEVICES

(71) Applicant: JIN TAY INDUSTRIES CO., LTD., New Taipei (TW)

(72) Inventor: Kuo-Tsung Yang, Taipei (TW)

(73) Assignee: JIN TAY INDUSTRIES CO., LTD., New Taipei (TW)

( * ) Notice: Subject to any disclaimer, the term of this patent is extended or adjusted under 35 U.S.C. 154(b) by 317 days.

This patent is subject to a terminal disclaimer.

(21) Appl. No.: 17/519,447

(22) Filed: Nov. 4, 2021

(65) Prior Publication Data

US 2023/0135591 A1 May 4, 2023

(51) Int. Cl.
*E05B 73/00* (2006.01)
*E05B 37/02* (2006.01)

(52) U.S. Cl.
CPC .......... *E05B 73/0082* (2013.01); *E05B 37/02* (2013.01); *E05B 73/0005* (2013.01)

(58) Field of Classification Search
CPC ... E05B 73/0005; E05B 73/0082; E05B 37/02
See application file for complete search history.

(56) References Cited

U.S. PATENT DOCUMENTS

| | | | | |
|---|---|---|---|---|
| 9,187,934 | B1 * | 11/2015 | Lee | E05B 73/0005 |
| 10,400,482 | B2 * | 9/2019 | Kao | E05B 73/0082 |
| 10,808,431 | B2 * | 10/2020 | Su | E05B 73/0082 |
| 11,203,886 | B2 * | 12/2021 | Wu | E05B 73/0082 |
| 11,808,061 | B2 * | 11/2023 | Yang | E05B 73/0082 |
| 2016/0281389 | A1 | 9/2016 | Chow | |
| 2020/0080346 | A1 * | 3/2020 | Wu | E05B 73/0082 |
| 2020/0181950 | A1 * | 6/2020 | Su | E05B 73/0082 |
| 2023/0079422 | A1 * | 3/2023 | Su | E05B 73/0082 70/21 |

(Continued)

FOREIGN PATENT DOCUMENTS

| | | |
|---|---|---|
| TW | 392753 | 6/2000 |
| TW | 413259 | 11/2000 |
| TW | 467185 | 12/2001 |

(Continued)

*Primary Examiner* — Christopher J Boswell
(74) *Attorney, Agent, or Firm* — Sinorica International Patent & Trademark

(57) ABSTRACT

A universal security lock for portable electronic devices has a base and a lock core. An operating part, a blocker, a displacement absorber, an expanding rod, and two gripping fingers are arranged in the base. The operating part is slidably mounted through the rear opening and is slidable toward the front opening to an engaged position. The displacement absorber is a spring or two mutually repelling magnets that drive the operating part and the expanding rod away from each other. The two gripping fingers are pivotally mounted to the base and disposed on a front opening of the base. When the operating part is in the engaged position, the displacement absorber pushes the expanding rod toward the front opening to move the outer ends of the two gripping fingers away from each other gradually such that the gripping fingers engage with security slots of different widths.

18 Claims, 17 Drawing Sheets

(56) References Cited

U.S. PATENT DOCUMENTS

| | | | | |
|---|---|---|---|---|
| 2023/0133788 A1* | 5/2023 | Yang | .................. | E05B 73/0082 70/58 |
| 2023/0139662 A1* | 5/2023 | Yang | .................. | E05B 73/0082 70/58 |

FOREIGN PATENT DOCUMENTS

| | | |
|---|---|---|
| TW | M401684 | 4/2011 |
| TW | 201318511 A | 5/2013 |
| TW | M583478 | 9/2019 |
| TW | I737524 B | 8/2021 |

* cited by examiner

UNIVERSAL SECURITY LOCK FOR PORTABLE ELECTRONIC DEVICES

BACKGROUND OF THE INVENTION

1. Field of the Invention

The present invention relates to a security lock, especially to a security lock that is configured to secure portable electronic devices.

2. Description of the Prior Arts

A portable device, such as a laptop, often has a security slot formed in its case such that a specialized security lock can be used for securing the portable device to a permanent object, such as a table or a display case. The security lock prevents the portable device from theft when displayed in showrooms or when temporarily left unattended in public areas such as a library.

The security slot is a hole formed through an exterior wall of the case of the portable device. An end of the security lock is fastened to the permanent object. An expandable gripper is mounted on another end of the security lock. The expandable gripper is configured to be mounted through the security slot and then expand inside the case such that the gripper is engaged in the security slot to prevent the gripper from being pulled out. As a result, the portable device can be fastened to the permanent object using the security lock.

The security slot has a variety of specifications, and each of the specifications features a unique opening width; meanwhile, thickness of the exterior wall of the case varies from one portable device to another portable device. However, the expandable gripper of the conventional security lock can only be expanded to a specific opened position; that is, the expandable gripper can only expand to a specific width. As a result, each security lock is compatible only with a specific type of security slot, which causes inconvenience to a user and increases cost. For example, each time the user purchases a new laptop with a different security slot, a new security lock has to be prepared. When laptops of different security slots are displayed in the showroom, security locks of different specifications have to be prepared, which is troublesome and costly.

To be more specific, there are three major security slot systems, which are Kensington Slot™, Noble Wedge Slot™, and Kensington Nano Slot™. The Kensington Slot™ has standard rectangular slots, and has introduced oblong slots recently. The Noble Wedge Slot™ has wedge holes, and has introduced 3 mm by 5 mm rectangular hole recently for DELL™ laptops as well as other laptops. As a result, there are totally six different kinds of security slots from the three major systems.

Moreover, among security slots of the same kind, the security slot in one laptop may differ from the security slot in another laptop when said two laptops are of different brands. For example, thickness of a metal plate where the security slot is formed may vary, thickness of the laptop case may vary, and assembly position of said metal plate on the laptop case may vary. As a result, one security lock cannot be employed universally for different kinds of security slots.

To overcome the shortcomings, the present invention provides a universal security lock for portable electronic devices to mitigate or obviate the aforementioned problems.

SUMMARY OF THE INVENTION

The main objective of the present invention is to provide a universal security lock for portable electronic devices that is compatible to different types of security slots for ease of use and cost reduction.

The universal security lock for the portable electronic devices has a base, a lock core, and an engaging mechanism. The base has an inner space which extends along an imaginary extension line and forms a front opening and a rear opening. The front opening and the rear opening are each disposed on a respective one of two opposite ends of the base. The lock core is mounted on the base and has an actuating block which is movably disposed in the inner space. The engaging mechanism is disposed in the inner space and has an operating part, a blocker, a displacement absorber, an expanding rod, and two gripping fingers. The operating part, the displacement absorber, the expanding rod, and the two gripping fingers are disposed along the extension line toward the front opening. The operating part is slidably mounted through the rear opening and is slidable toward the front opening to an engaged position. The blocker is mounted on the operating part and protrudes from a side, which faces toward the lock core, of the operating part. The expanding rod is slidably disposed in the inner space and is slidable along the extension line; an end, which is away from the rear opening, of the expanding rod is defined as an abutting end. The displacement absorber drives the operating part and the expanding rod such that the operating part and the expanding rod tend to move away from each other. Each of the gripping fingers has an inner end, an outer end, an inner surface, an outer surface, and an electronic-device-engaging portion. The inner end is located in the inner space and is pivotal relative to the base. Each of the two inner ends of the two gripping fingers are disposed on a respective one of two opposite sides of the expanding rod. The outer end protrudes from the base via the front opening. The inner surface faces toward another one of the gripping fingers. The outer surface is opposite to the inner surface. The electronic-device-engaging portion protrudes from the outer surface and is disposed on the outer end. When the expanding rod is moved toward the front opening, the abutting end of the expanding rod abuts against the two inner surfaces of the two gripping fingers and drives the two electronic-device-engaging portions to move away from each other gradually. When the operating part is in the engaged position, the displacement absorber pushes the expanding rod toward the front opening such that the two electronic-device-engaging portions of the two gripping fingers are driven to move away from each other; the blocker is disposed in the inner space of the base and abuts against the actuating block of the lock core or an inner wall of the base to keep the operating part in the engaged position.

The displacement absorber has a spring or two magnets that repel each other. To engage the universal security lock with an electronic device, first pivot the two gripping fingers toward each other such that the two electronic-device-engaging portions of the two gripping fingers are closely adjacent to each other. Then, insert the two electronic-device-engaging portions into a security slot of the electronic device, and then press the operating part to move the operating part to the engaged position. In the engaged position, the operating part drives the expanding rod via the displacement absorber to move the two electronic-device-engaging portions away from each other to prevent the two gripping fingers from being pulled out from the security slot.

To disengage the universal security lock from the electronic device, operate the lock core to move the operating part away from the engaged position to reduce driving force of the displacement absorber. As a result, the two electronic-device-engaging portions are able to move toward each other, allowing the two gripping fingers to be pulled out from the security slot.

The advantage of the present invention is that the operating part drives the expanding rod via the displacement absorber, and movement of the expanding rod gradually expands the two electronic-device-engaging portions; that is, the two electronic-device-engaging portions are moved away gradually by the movement of the expanding rod. As a result, when the operating part is moved to the engaged position, the displacement absorber continuously pushes the expanding rod toward the front opening and forces the two electronic-device-engaging portions to expand until the two gripping fingers are stopped by width of the security slot. Therefore, the present invention is compatible with security slots of different widths and can be adjusted in a stepless manner.

In other words, when the operating part is moved to the same engaged position, the two gripping fingers can be expanded to multiple different expanded positions, unlike conventional security lock that can only be expanded to a single expanded position. As a result, the present invention is compatible with security slots of different widths.

Other objectives, advantages and novel features of the invention will become more apparent from the following detailed description when taken in conjunction with the accompanying drawings.

BRIEF DESCRIPTION OF THE DRAWINGS

FIG. 3 is a longitudinal sectional view of the universal security lock in

FIG. 1, showing an operating part of an operating mechanism disposed in a disengaged position;

DETAILED DESCRIPTION OF THE PREFERRED EMBODIMENTS

Figure 1:
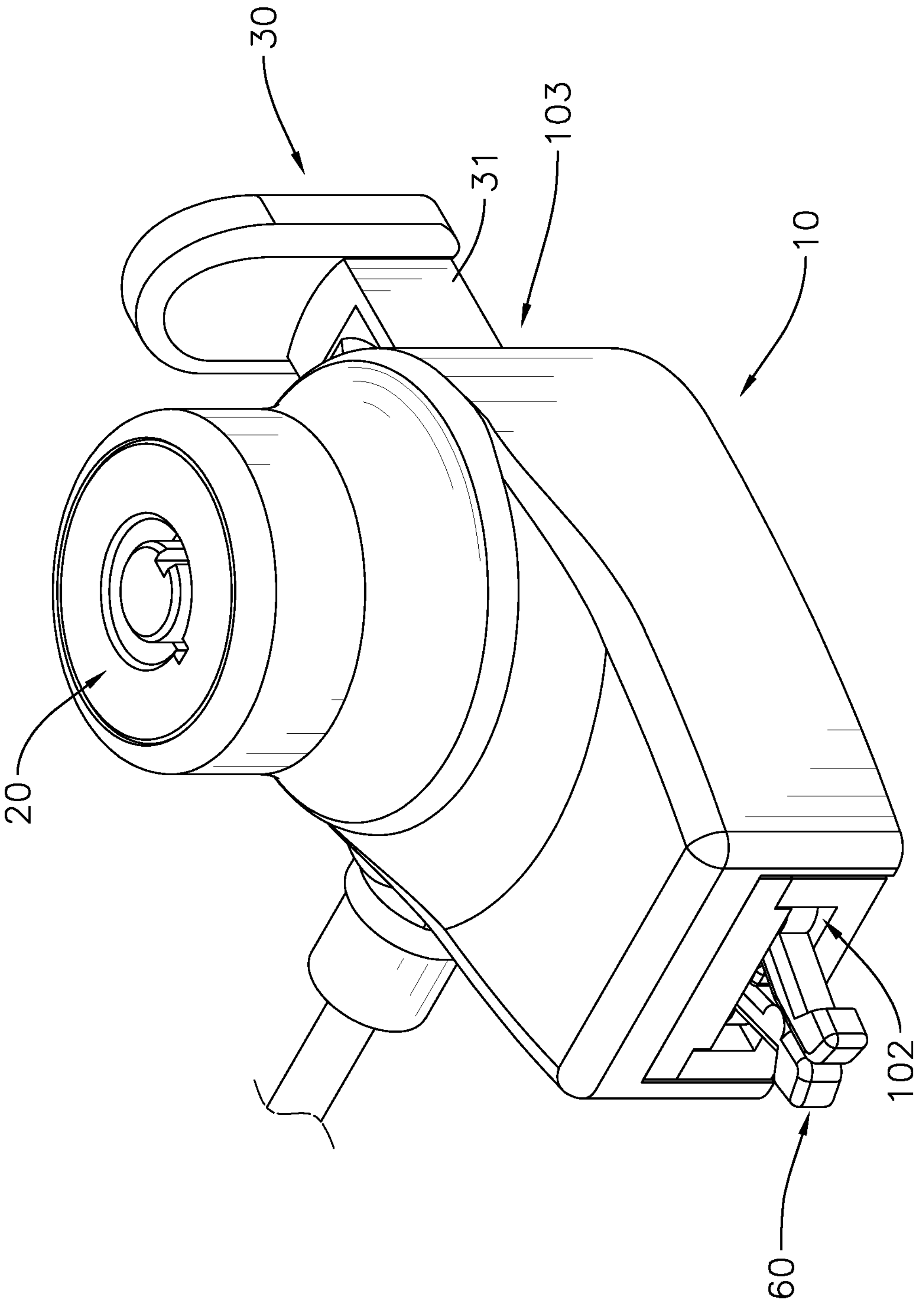
FIG. 1 is a perspective view of a first embodiment of a universal security lock for portable electronic devices in accordance with the present invention.
Figure 2:
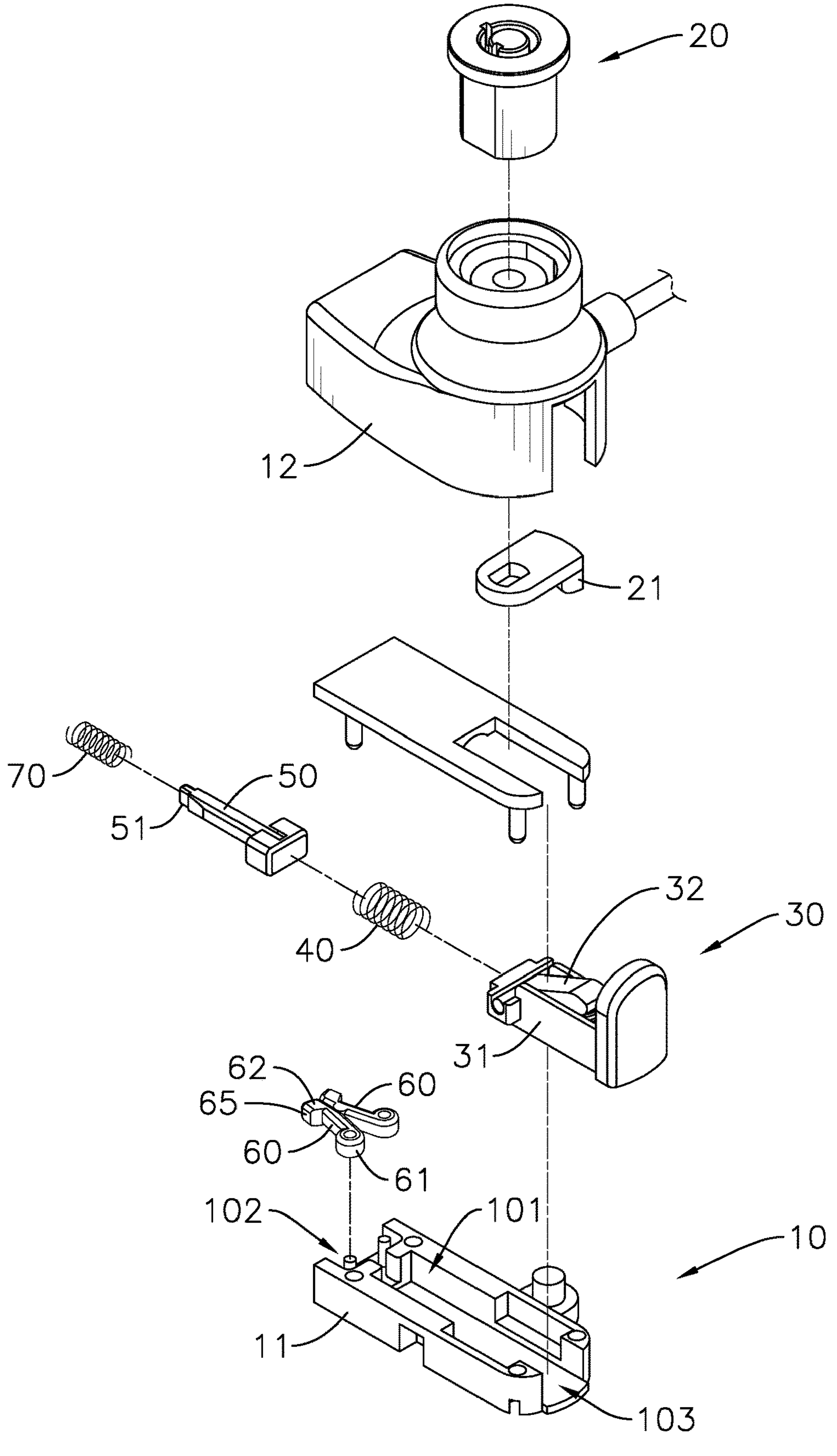
FIG. 2 is an exploded view of the universal security lock in FIG. 1.
Figure 3:
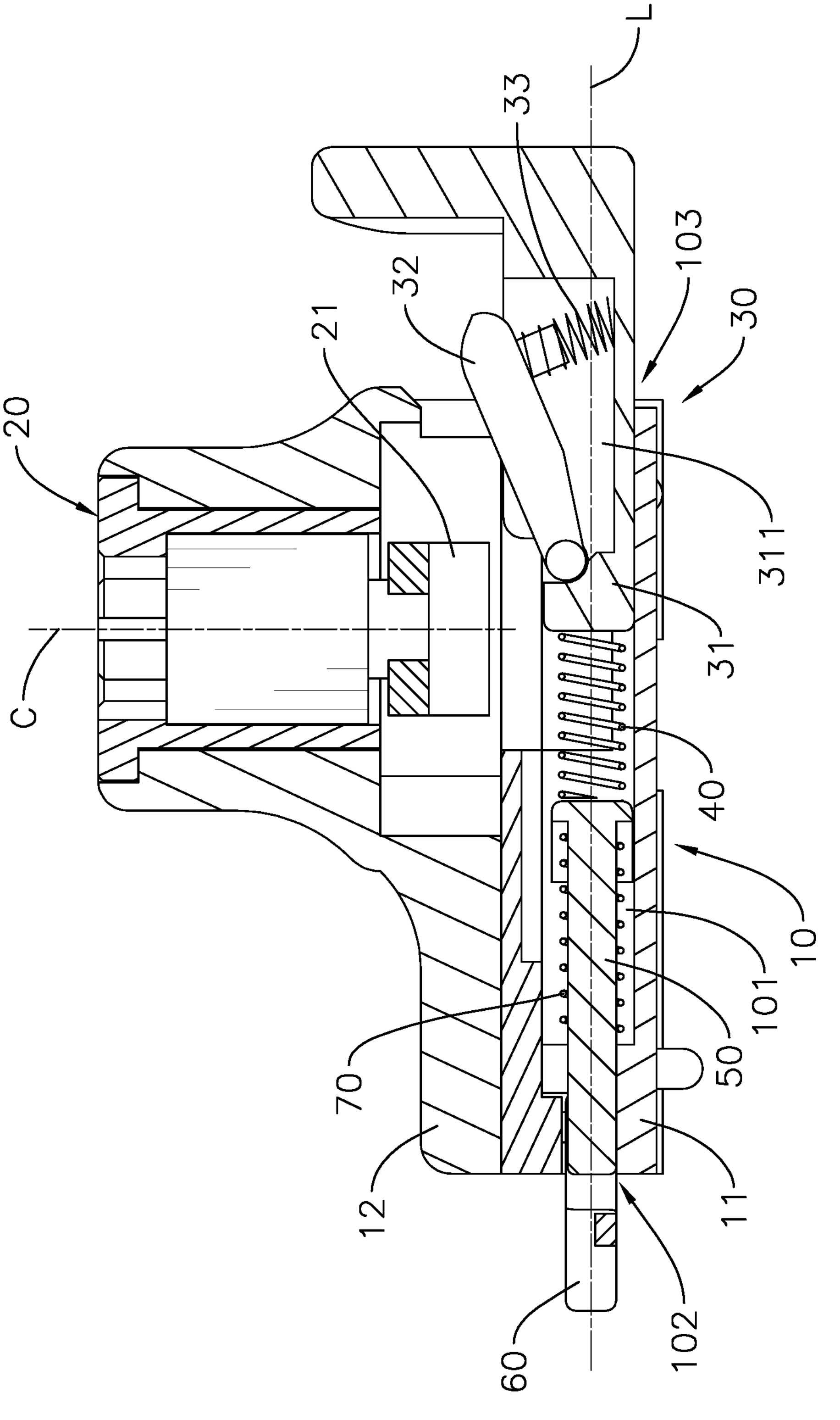

With reference to FIGS. 1 to 3, a universal security lock for portable electronic devices in accordance with the present invention is configured to engage with a security slot 91 of a portable electronic device. The universal security lock comprises a base 10, a lock core 20, an operating mechanism 30, a displacement absorber 40, an expanding rod 50 and two gripping fingers 60. In the preferred embodiment, the universal security lock further comprises a returning resilient element 70.

The base 10 has an inner space 101 which extends along an imaginary extension line L and forms a front opening 102 and a rear opening 103. The front opening 102 and the rear opening 103 are each disposed on a respective one of two opposite ends of the base 10.

The operating mechanism 30, the displacement absorber 40, the expanding rod 50, and the gripping fingers 60 are disposed along the extension line L toward the front opening 102. In the preferred embodiment, the base 10 has a lower seat 11 and an upper cover 12, and the inner space 101 is an elongated recess formed in a top surface of the lower seat 11. Moreover, the base 10 further has a partition plate that is disposed between the lower seat 11 and the upper cover 12. The partition plate has multiple through holes. The extension line L is preferably a straight line, but can be a bent line.

The lock core 20 is mounted on the base 10 and has an actuating block 21 which is movably disposed in the inner space 101. The lock core 20 is a conventional standard lock core that is used in combination with a key or codes to lock or unlock a conventional lock; therefore, detailed description of the lock core 20 is omitted.

Figure 4:
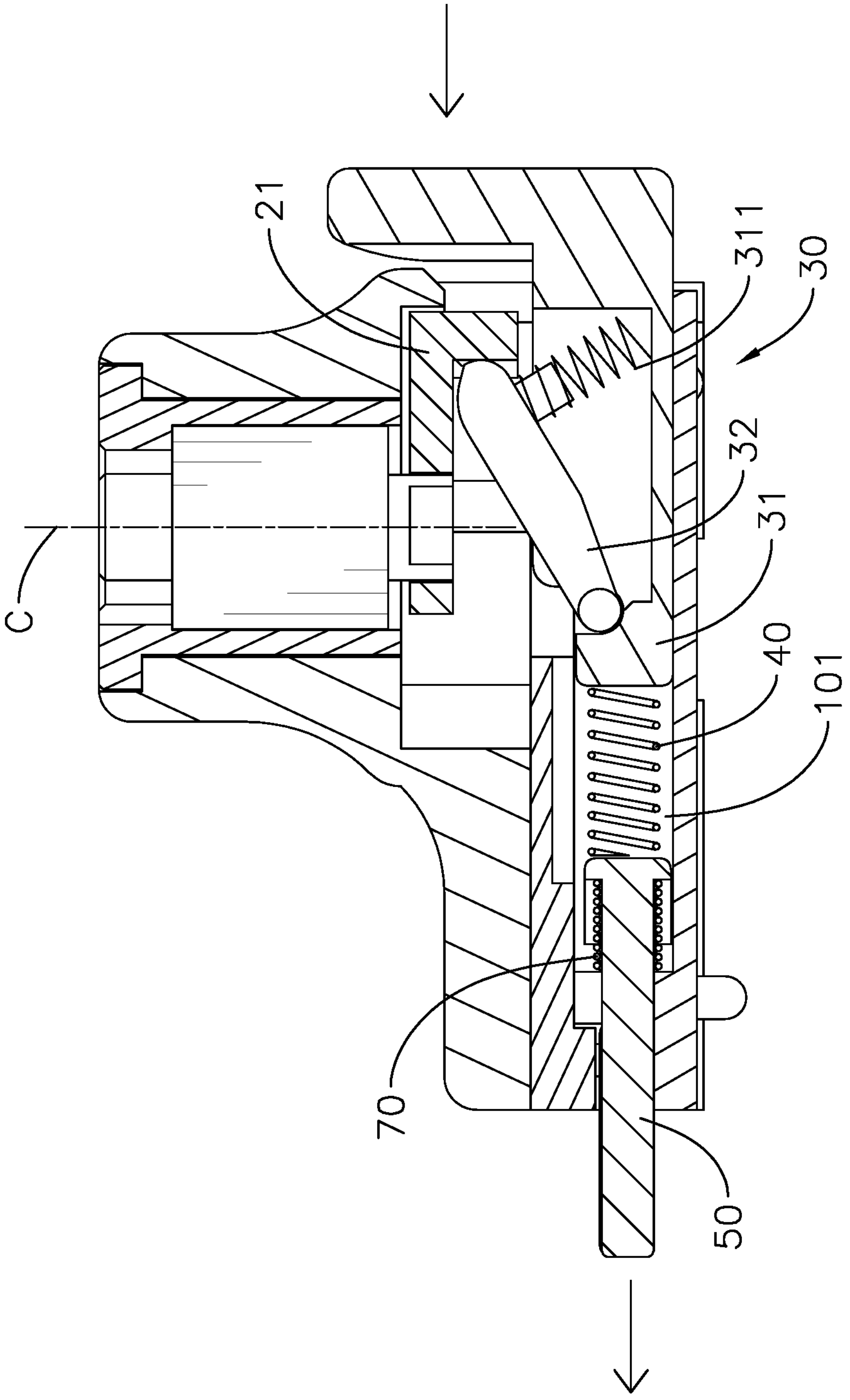
FIG. 4 is another longitudinal sectional view of the universal security lock in FIG. 1, showing the operating part moved to an engaged position, and an actuating block of a lock core rotated to a side, which is toward a rear opening, of a blocker to keep the operating part in the engaged position.
Figure 7:
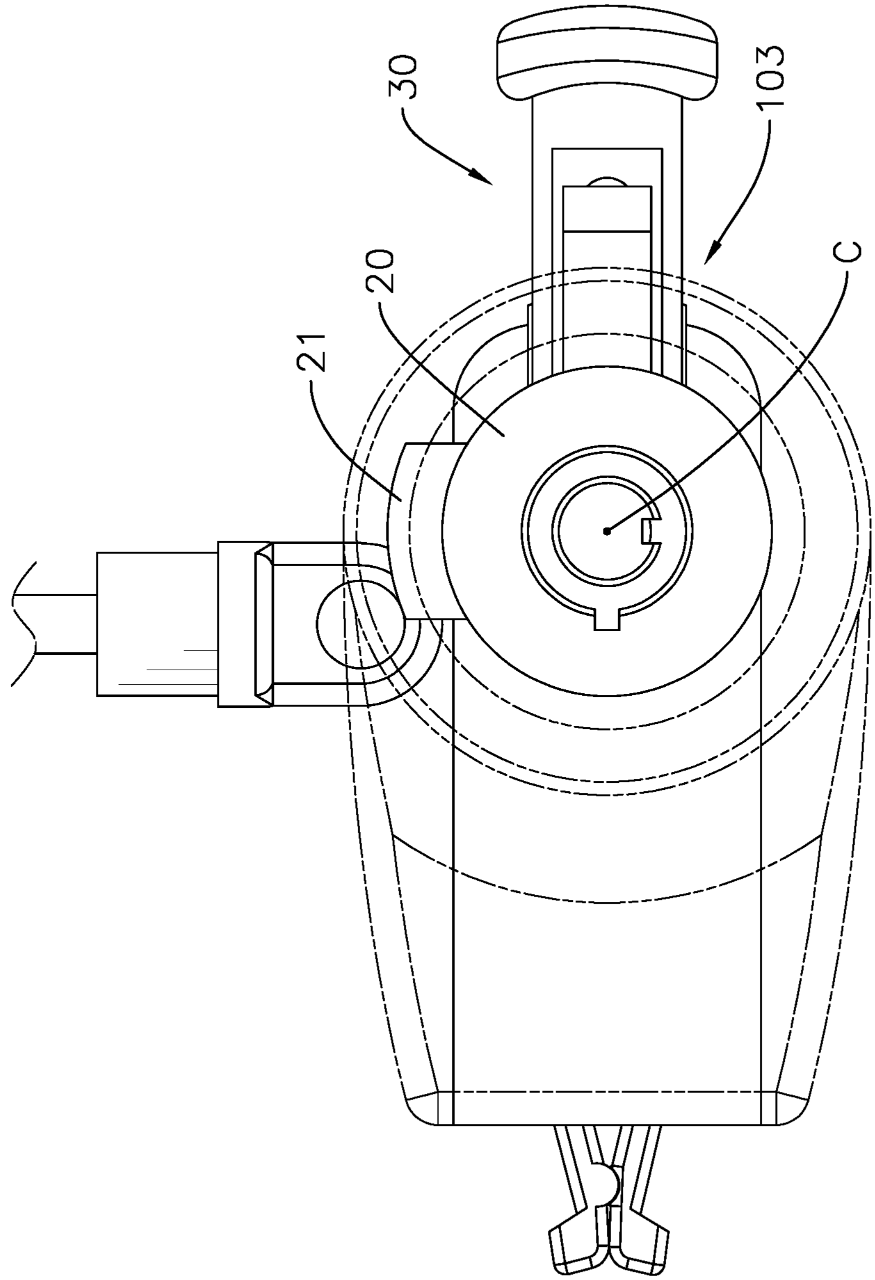
FIGS. 7 and 8 are top views of the universal security lock in FIG. 1, showing the actuating block of the lock core rotated around a center line of the lock core to a locked status.
Figure 8:
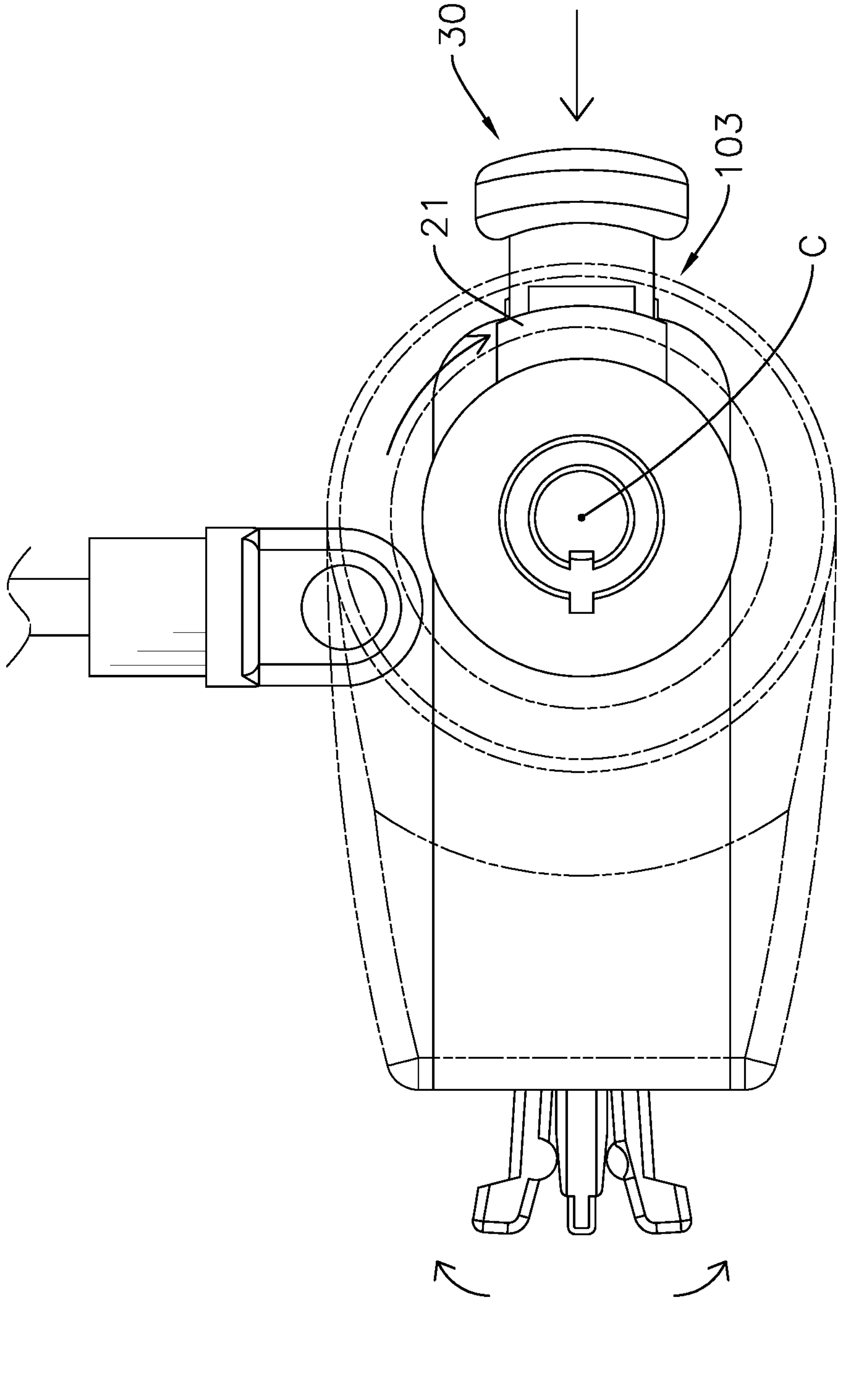
Figure 9:
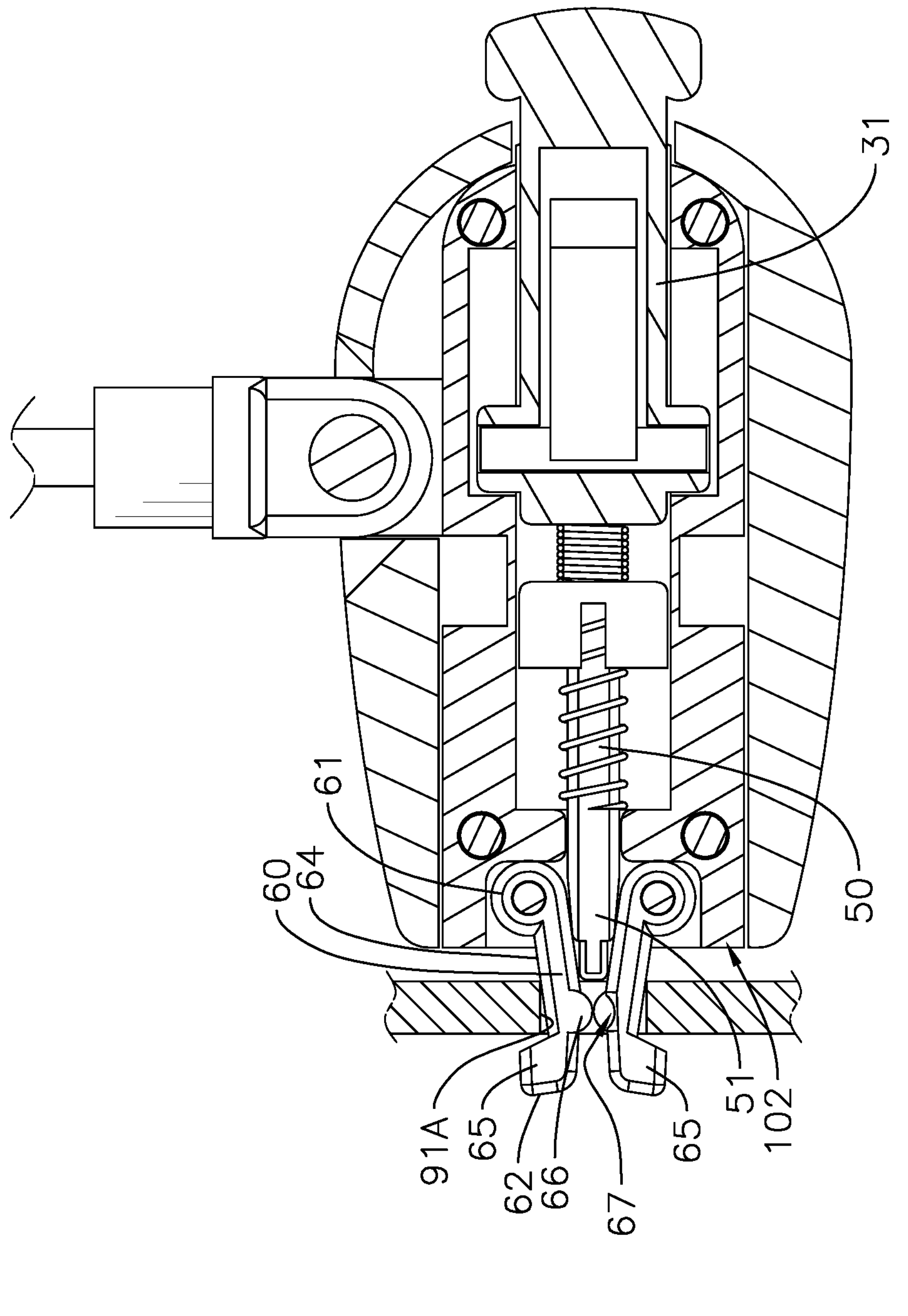
FIG. 9 is another operational cross sectional view of the universal security lock in FIG. 1, showing that when the operating part is in the same engaged position, two electronic-device-engaging portions of the two gripping fingers can be moved to a different expanded position to engage in a security slot of a different width.

With reference to FIGS. 3, 4, 7, and 8, after insertion of a key (not shown in figures) into the lock core 20, the actuating block 21 can be rotated around a center line C of the lock core 20 to the rear opening 103 such that the rear opening 103 is partially covered by the actuating block 21, and this condition is defined as a locked status (as shown in FIGS. 4 and 8). When the actuating block 21 is rotated away from the rear opening 103 by the key, the condition of the lock core 20 is defined as an unlocked status (as shown in FIGS. 3 and 7).

With reference to FIGS. 3 to 6, the operating mechanism 30 is slidable relative to the base 10, and has an operating part 31 and a blocker 32. In the preferred embodiment, the operating mechanism 30 further has a blocker resilient element 33.

Figure 5:
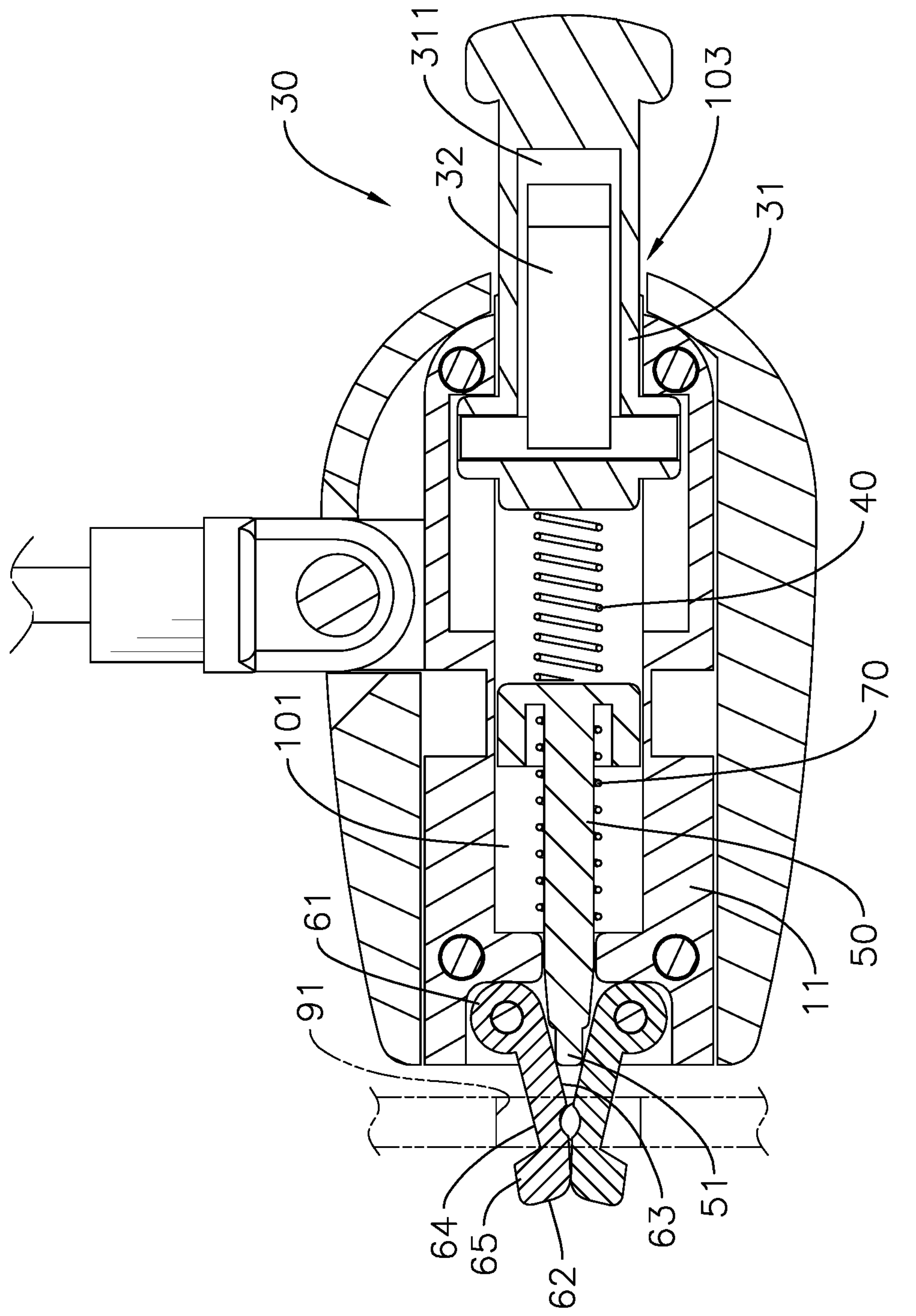
FIGS. 5 and 6 are operational cross sectional views of the universal security lock in FIG. 1, showing the operating part moved from the disengaged position to the engaged position, and the operating part making two gripping fingers pivot away from each other.
Figure 6:
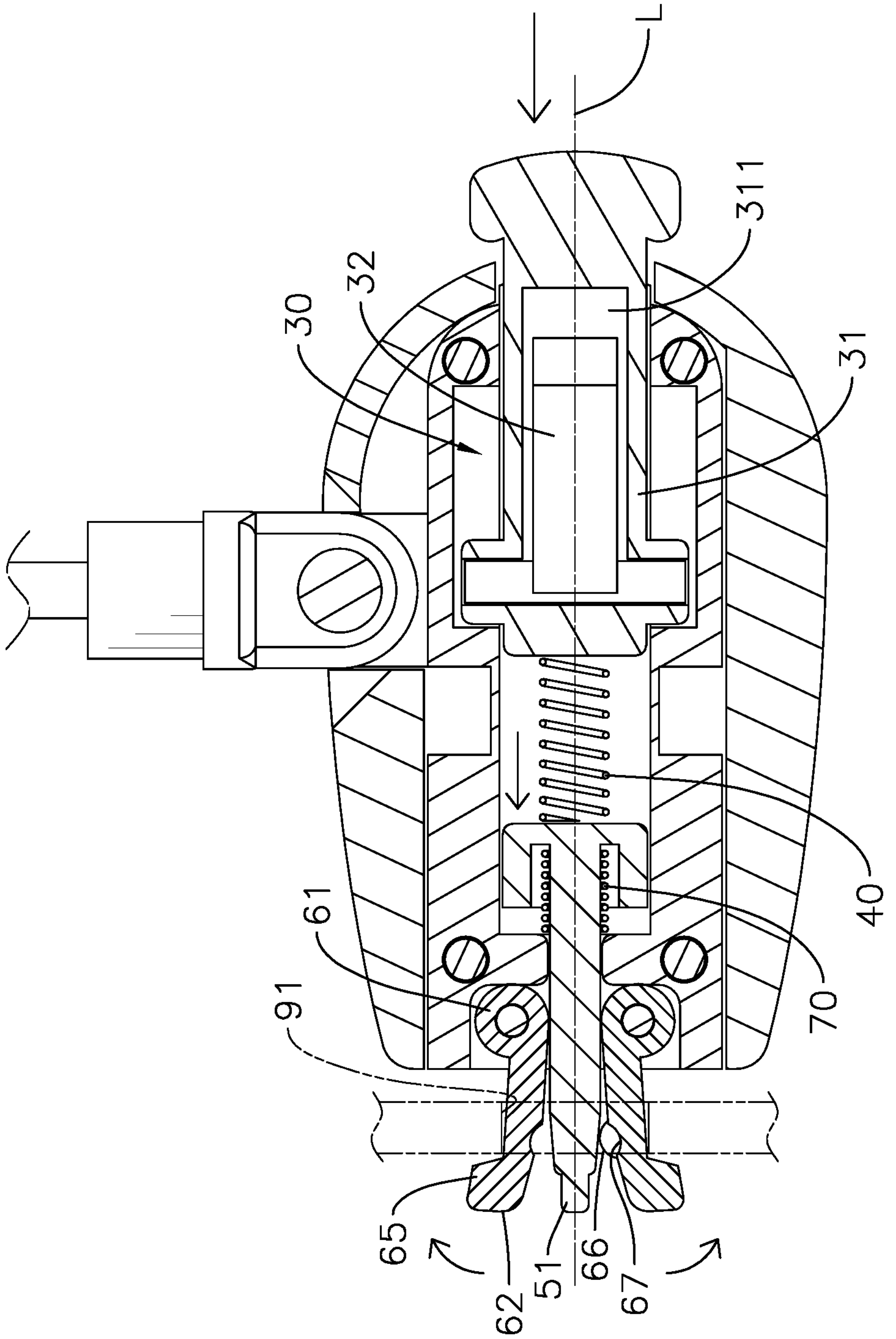

The operating part 31 is slidably mounted through the rear opening 103, and is slidable toward the front opening 102 to an engaged position (as shown in FIGS. 4 and 6) or slidable away from the front opening 102 to a disengaged position (as shown in FIGS. 3 and 5). The blocker 32 is mounted on the operating part 31 and protrudes from a side, which faces toward the lock core 20, of the operating part 31. When the operating part 31 is in the engaged position, the blocker 32 is in the inner space 101; when the operating part 31 is in the disengaged position, the blocker 32 preferably protrudes from the base 10.

In the preferred embodiment, the operating part 31 has an accommodating recess 311 which opens toward the lock core 20. The blocker 32 is elongated, and two opposite ends of the blocker 32 are respectively a first end and a second end. The first end is disposed toward the front opening 102, pivotally mounted to the operating part 31, and disposed in the accommodating recess 311. The blocker resilient element 33 is a compression spring, and two ends of the blocker resilient element 33 abuts against the blocker 32 and a bottom of the accommodating recess 311 respectively such that the second end of the blocker 32 tends to protrude from the accommodating recess 311; that is, when the second end of the blocker protrudes from the accommodating recess 311, the blocker 32 is tilted in a way that even when the lock core 20 is in the locked status, the operating part 31 can still be forced to move from the disengaged position to the engaged position.

The blocker resilient element 33 is not limited to a compression spring as long as it drives the second end of the blocker 32 to protrude from the accommodating recess 311. Moreover, the blocker 32 is not limited to be pivotally mounted to the operating part 31. For example, the blocker 32 may move along a straight line relative to the operating part 31.

The displacement absorber 40 drives the operating part 31 of the operating mechanism 30 and the expanding rod 50 such that the operating part 31 and the expanding rod 50 tend to move away from each other. In the preferred embodiment, the displacement absorber 40 has a resilient element. To be precise, the displacement absorber 40 is a compression spring, and two opposite ends of the displacement absorber 40 abut against the operating part 31 and the expanding rod 50 respectively.

The displacement absorber 40 is not limited to a resilient element, and can further include other components as long as the displacement absorber 40 utilizes resiliency of the resilient element to drive the operating part 31 and expanding rod 50 to move away from each other. Moreover, the displacement absorber 40 may utilize repulsion between two magnetic elements to drive the operating part 31 and the expanding rod 50 such as in a second embodiment of the present invention.

The expanding rod 50 is slidably disposed in the inner space 101 and is slidable along the extension line L. An end, which is away from the rear opening 103, of the expanding rod 50 is defined as an abutting end 51. A width of the abutting end 51 increases toward the rear opening 103, but not limited thereto.

Each of the gripping fingers 60 has an inner end 61, an outer end 62, an inner surface 63, an outer surface 64 and an electronic-device-engaging portion 65. The inner end 61 is located in the inner space 101 and is pivotal relative to the base 10. Each of the two inner ends 61 of the two gripping fingers 60 is disposed on a respective one of two opposite sides of the expanding rod 50. The outer end 62 protrudes from the base 10 via the front opening 102. The inner surface 63 is defined as a surface of the gripping finger 60 that faces toward another gripping finger 60. The outer surface 64 is opposite to the inner surface 63. The electronic-device-engaging portion 65 protrudes from the outer surface 64 and is disposed on the outer end 62.

The gripping fingers 60 are configured to be mounted through the security slot 91 of the portable electronic device, and then the electronic-device-engaging portions 65 abut against an inner surface of the portable electronic device to prevent the gripping fingers 60 from being pulled out from the security slot 91.

Figure 12:
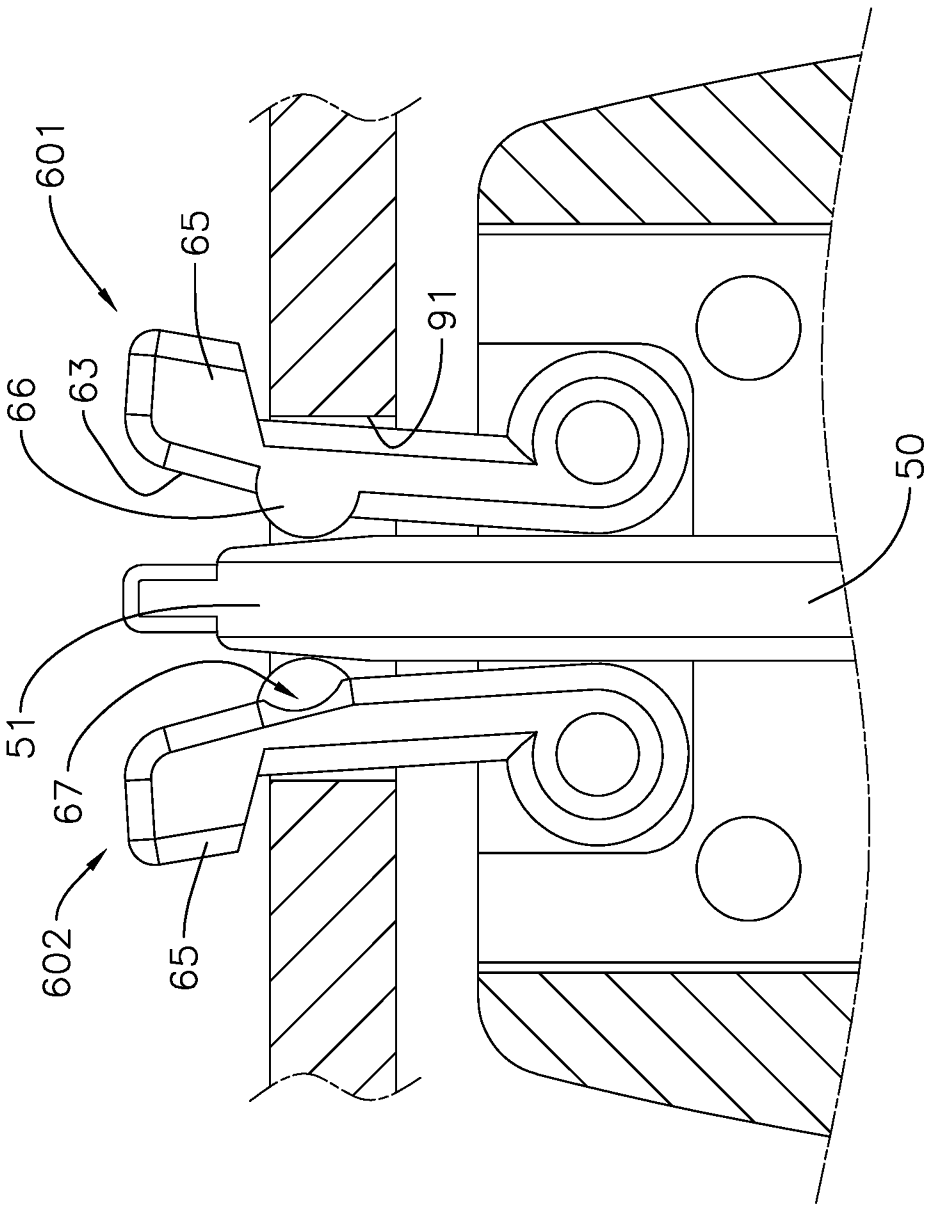

With reference to FIG. 12, the two gripping fingers 60 are respectively defined as a first gripping finger 601 and a second gripping finger 602 for ease of understanding. The inner surface 63 of the first gripping finger 601 has an opening protrusion 66 protruding thereon. The opening protrusion 66 is disposed closer to the inner end 61 of the first gripping finger 601 than the outer end 62 of the first gripping finger 601 is.

The inner surface 63 of the second gripping finger 602 has a closing recess 67 formed therein. When the first gripping finger 601 and the second gripping finger 602 pivot toward each other, the opening protrusion 66 of the first gripping finger 601 is movable into the closing recess 67 of the second gripping finger 602. The closing recess 67 increases a range of an angle at which the two gripping fingers 60 are pivotal toward each other by accommodating the corresponding opening protrusion 66.

In the preferred embodiment, the two gripping fingers 60 are structurally identical, and only differ in position. That is, the inner surface 63 of the second gripping finger 602 also has an opening protrusion 66 formed thereon, and the inner surface 63 of the first gripping finger 601 has a closing recess 67 formed therein. The opening protrusion 66 of the second gripping finger 602 is movable into the closing recess 67 of the first gripping finger 601.

With reference to FIGS. 5 and 9 to 12, when the expanding rod 50 is moved toward the front opening 102, the abutting end 51 of the expanding rod 50 abuts against the two inner surfaces 63 of the two gripping fingers 60 and drives the two electronic-device-engaging portions 65 to move away from each other gradually; that is, an angle formed by the two gripping fingers 60 gradually increases as the expanding rod 50 moves toward the front opening 102 such that a distance between the two electronic-device-engaging portions 65 gradually increases.

With reference to FIGS. 5 and 6, the returning resilient element 70 drives the expanding rod 50 to move toward the rear opening 103. When the operating part 31 is in the engaged position, restoring resilient force of the returning resilient element 70 exerted on the expanding rod 50 is smaller than force of the displacement absorber 40 exerted on the expanding rod 50 such that when the operating part 31 is moved away toward the front opening 102 to the disengaged position, the returning resilient element 70 does prevent the displacement absorber 40 from driving the expanding rod 50.

When the operating part 31 is moved away toward the front opening 102 to the disengaged position, the force of the displacement absorber 40 exerted on the expanding rod 50 reduces rapidly such that the force of the returning resilient element 70 exerted on the expanding rod 50 is greater than that of the displacement absorber 40. As a result, the expanding rod 50 is moved toward the rear opening 103 such that the angle formed between the two gripping fingers 60 gradually decreases.

In summary, when the operating part 31 is away from the engaged position, the returning resilient element 70 makes the expanding rod 50 move toward the rear opening 103 automatically such that the user can pull out the gripping fingers 60 from the security slot 91.

How to use the present invention is elaborated as follows.

With reference to FIGS. 3, 5, and 7, first set the universal security lock at the unlocked status; that is, the actuating block 21 is rotated away from the rear opening 103. In this status, the operating part 31 of the operating mechanism 30 is driven away from the expanding rod 50 to the disengaged position; in other words, the operating part 31 is driven toward the front opening 102 to the disengaged position. Pivot the two gripping fingers 60 toward each other such that the two electronic-device-engaging portions 65 are closely adjacent to each other, and then mount the two electronic-device-engaging portions 65 through the security slot 91.

With reference to FIGS. 4, 6, and 8, then press the operating part 31 to move the operating part 31 to the engaged position. Now the blocker 32 is moved into the inner space 101 of the base 10 by the operating part 31.

Then, set the lock core 20 at the locked status in which the actuating block 21 is moved to the rear opening 103 of the base 10 and partially covers the rear opening 103. Now the actuating block 21 is disposed on a side, which is toward the rear opening 103, of the blocker 32 to keep the operating part 31 in the engaged position. The operating part 31 pushes the expanding rod 50 toward the front opening 102 via the displacement absorber 40, causing the two electronic-device-engaging portions 65 of the two gripping fingers 60 to move away from each other such that the universal security lock is engaged with the security slot 91.

In the preferred embodiment, the blocker 32 can be retracted into the accommodating recess 311 of the operating part 31, and therefore it is also possible to move the operating part 31 from the disengaged position to the engaged position even when the lock core 20 is at the locked status. In other words, the user may move the operating part 31 to the engaged position regardless of the status of the lock core 20, making the universal security lock more convenient to use.

With reference to FIGS. 6 and 9 to 12, when the operating part 31 is moved to the engaged position, the displacement absorber 40 forces the two electronic-device-engaging portions 65 to move away from each other via the expanding rod 50 until the gripping fingers 60 are limited by width of the security slot 91. As a result, the present invention enables the distance between the two electronic-device-engaging portions 65 to be adjusted in a stepless manner; that is, the two gripping fingers 60 are capable of engaging with security locks 91, 91A, 91B, and 91C that differ in width given that the operating part 31 is in the same engaged position.

To disengage the universal security lock from the security slot 91, simply restore the lock core 20 to the unlocked status.

Figure 10:
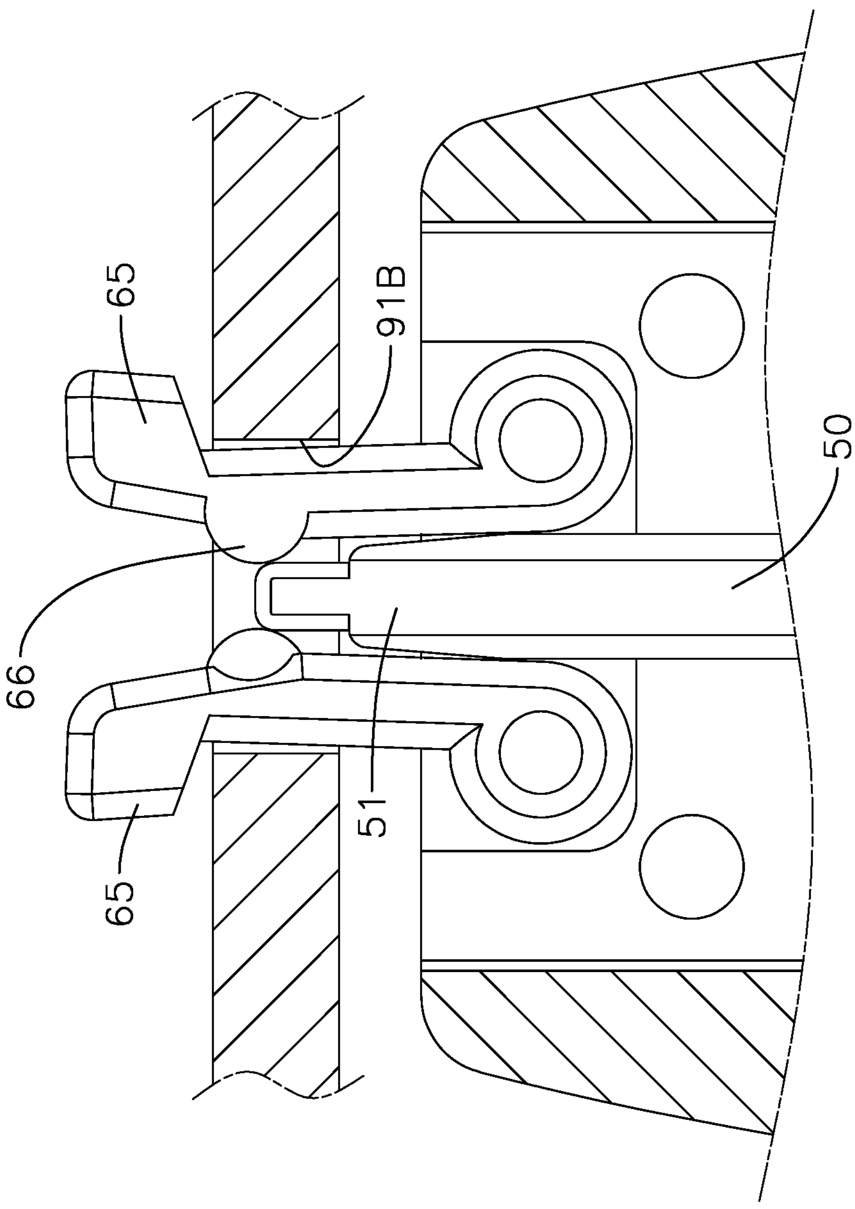
FIGS. 10 to FIG. 12 are operational partial enlarged cross-sectional views of the universal security lock in FIG. 1, showing the two electronic-device-engaging portions can be moved to different expanded positions to engage in security slots of different widths.
Figure 11:
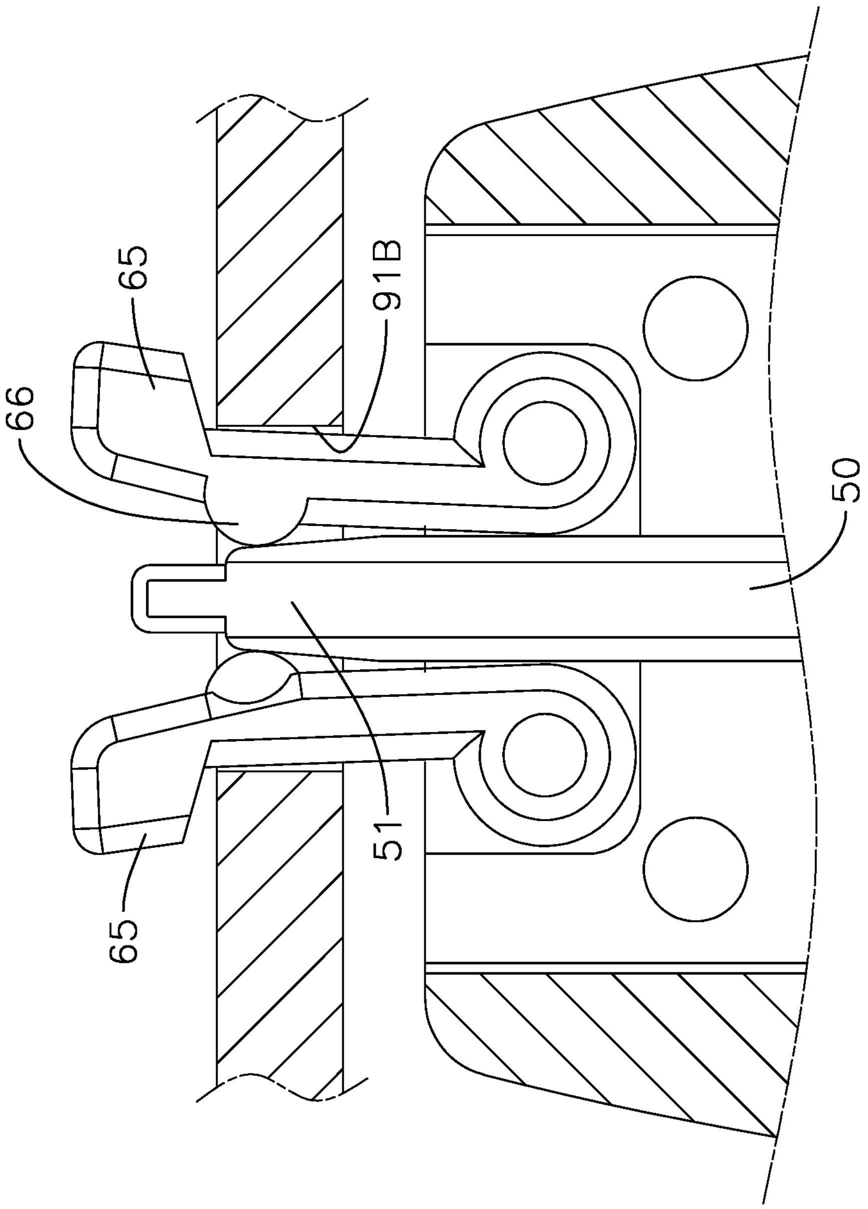

With reference to FIGS. 10 and 12, the abutting end 51 of the expanding rod 50 is capable of abutting against the opening protrusion 66 of the first gripping finger 601 to further increase the distance between two electronic-device-engaging portions 65 such that the gripping fingers 60 are capable of engaging with security slots 91 of greater widths.

The universal security lock for portable electronic devices in the first embodiment can also be deemed as follows. The electronic device has a base 10, a lock core 20, and an engaging mechanism. The engaging mechanism is disposed in the inner space 101 of the inner space base 10 and includes the operating part 31, the blocker 32, the displacement absorber 40, the expanding rod 50, and the two gripping fingers 60. The operating part 31, the displacement absorber 40, the expanding rod 50, and the two gripping fingers 60 are disposed along the extension line L toward the front opening 102.

Figure 13:
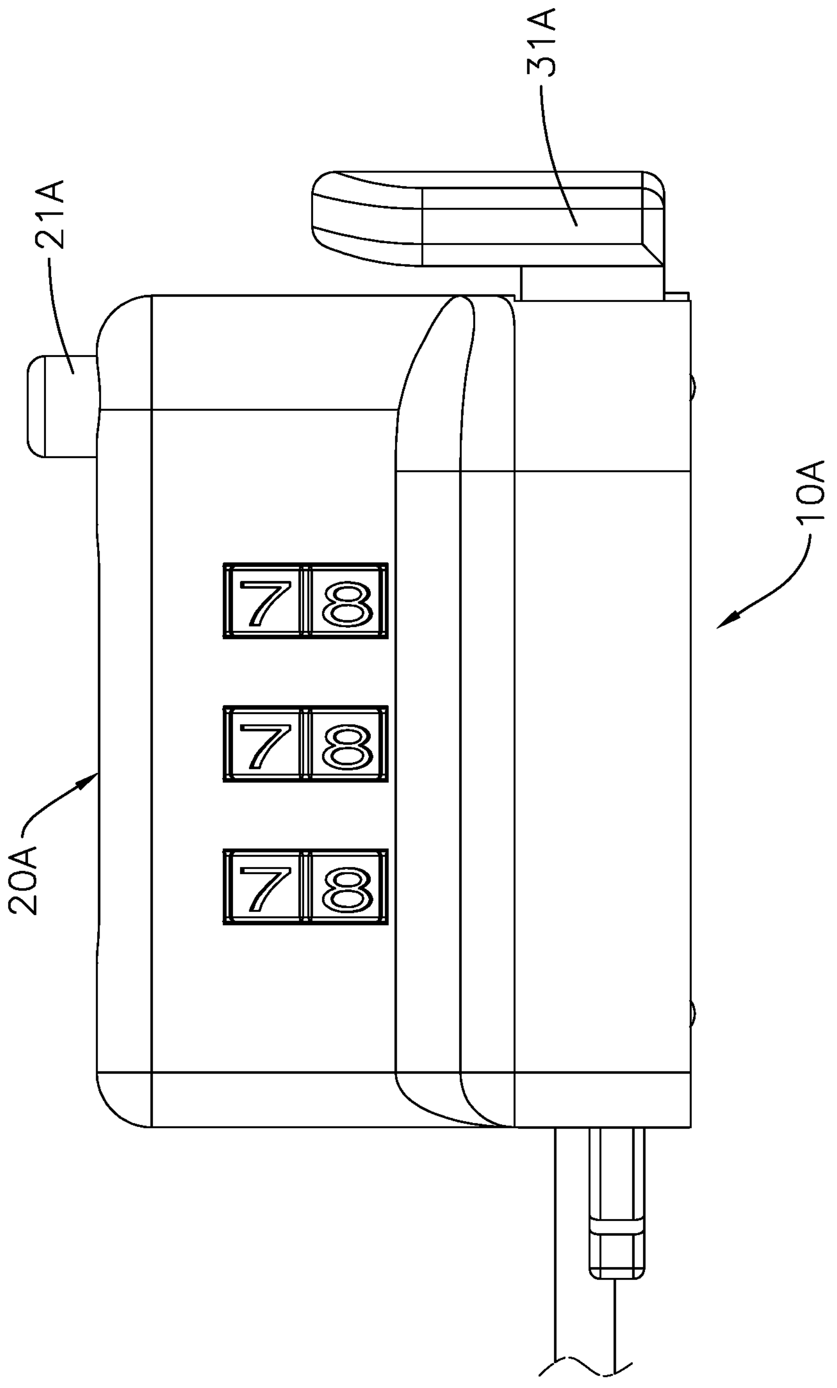
FIG. 13 is a schematic side view of a second embodiment of a universal security lock for portable electronic devices in accordance with the present invention.
Figure 14:
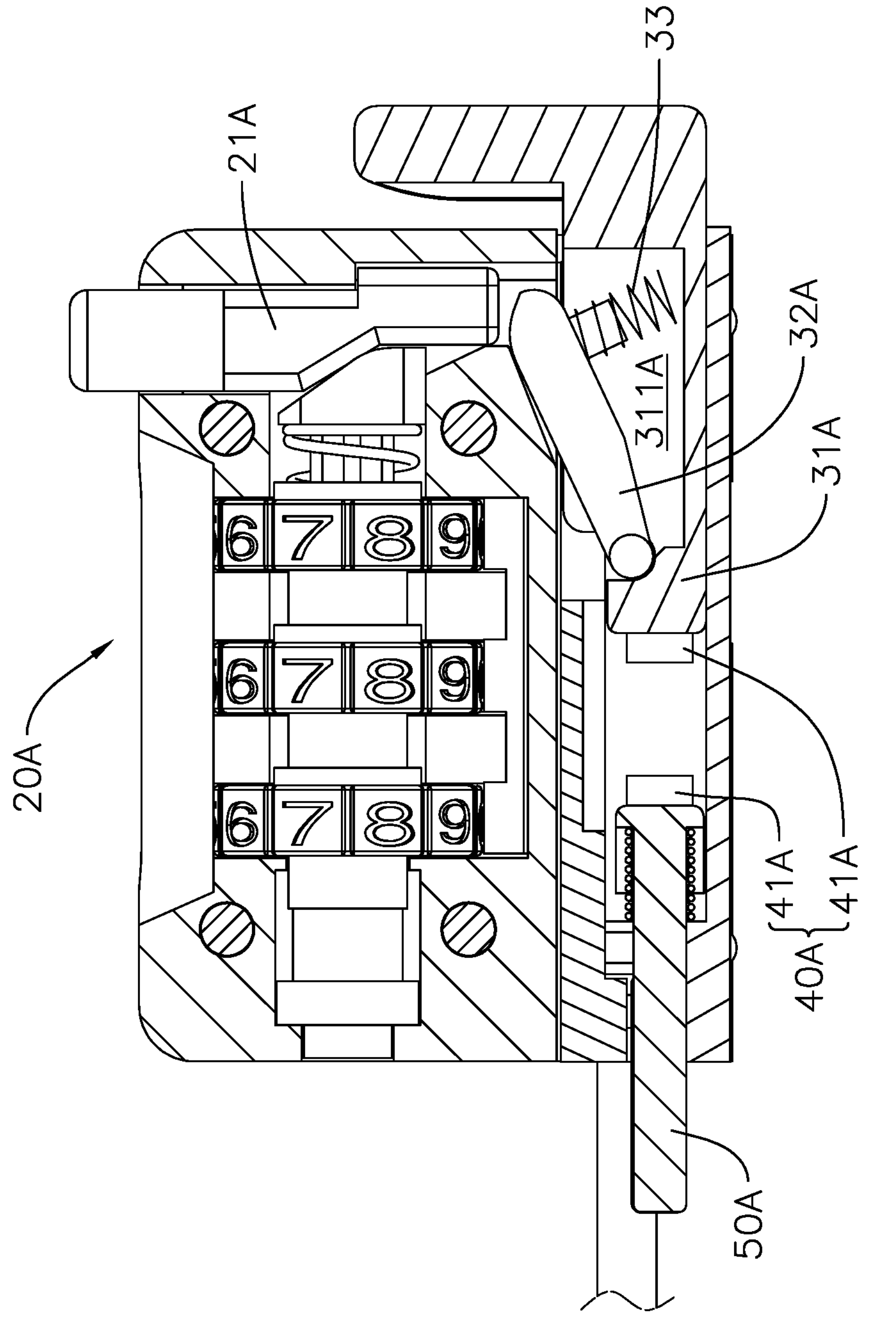
FIGS. 14 and 15 are longitudinal sectional views of the universal security lock in FIG. 13, showing an actuating block being pressed to make the blocker retracted into an accommodating recess, and an operating part returned from an engaged position to a disengaged position automatically.
Figure 15:
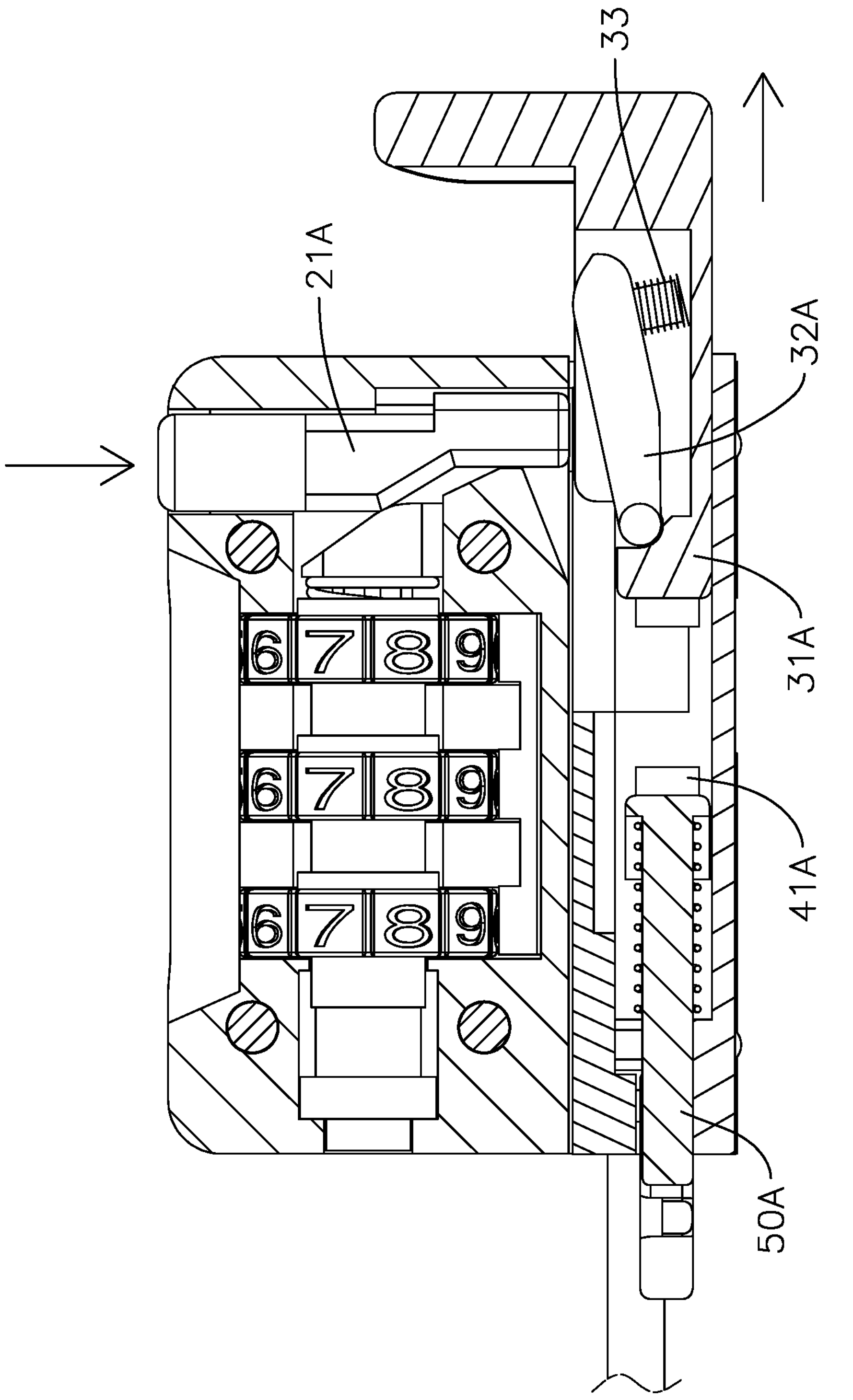

With reference to FIGS. 13 to 15, a second embodiment of the universal security lock is substantially similar to the first embodiment mentioned above, but the difference is that the lock core 20A is a combination lock, and function of the lock core 20A is not to keep the operating part 31A in the engaged position, but rather to release the operating part 31A from the engaged position.

In the second embodiment, when the operating part 31A is in the engaged position, the blocker 32A protrudes from the accommodating recess 311A and abuts against an inner wall of the base 10A to keep the operating part 31A in the engaged position. In other words, instead of using the lock core 20A to keep the operating part 31A in position, the base 10A is used for keeping the operating part 31A in the engaged position.

To disengage the universal security lock with the security slot 91, the user has to input correct combination, and then press down the actuating block 21A to make the blocker 32A retracted into the accommodating recess 311A, such that the operating part 31 automatically returns to the disengaged position (as shown in FIG. 15).

Moreover, the displacement absorber 40A in the second embodiment includes two magnetic elements 41A. One of the magnetic elements 41A is mounted on the operating part 31A of the operating mechanism 30A, and the other magnetic element 41A is mounted on the expanding rod 50A. The two magnetic elements 41A repel each other such that the operating part 31A and the expanding rod 50A are driven to move away from each other.

The displacement absorber 40A can further include other components as long as the displacement absorber 40A utilizes repulsion between the two magnetic elements 41A to drive the operating part 31A and the expanding rod 50A to move away from each other.

Figure 16:
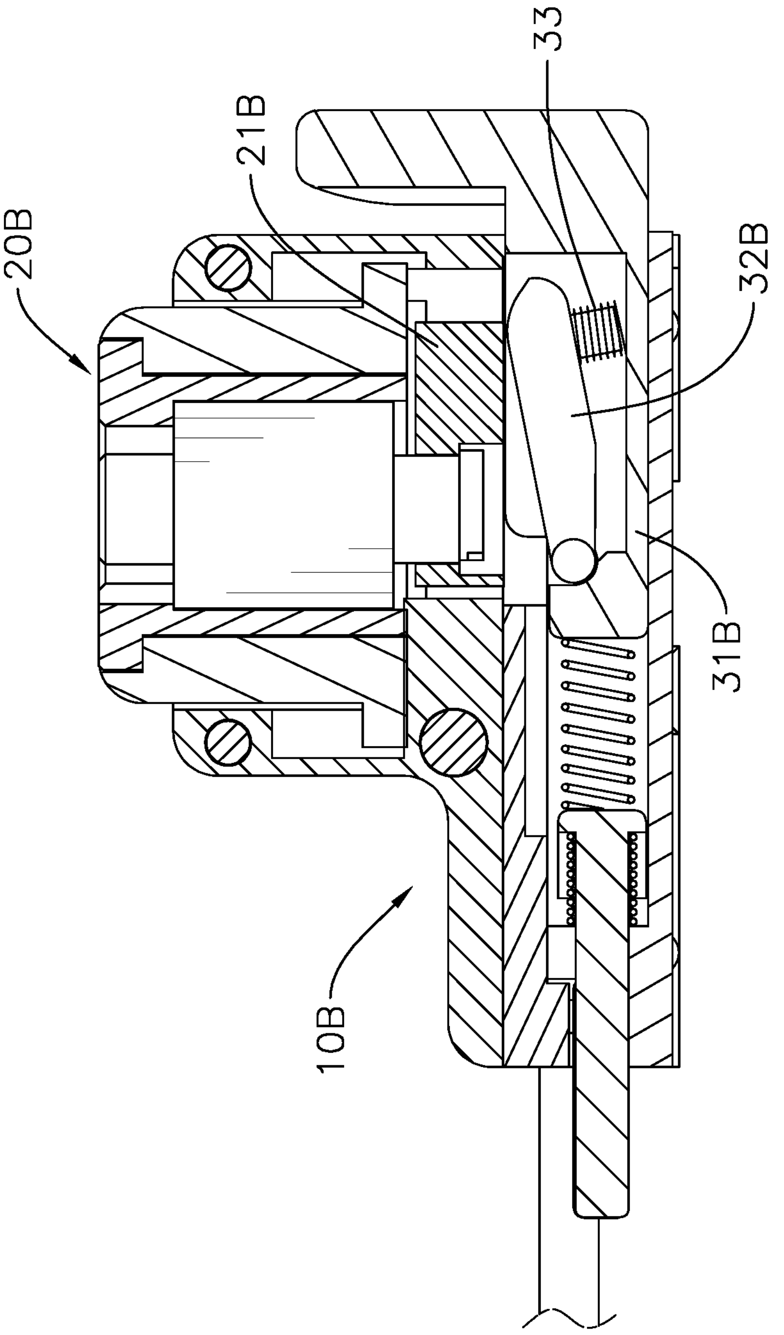
FIGS. 16 and 17 are longitudinal sectional views of a third embodiment of a universal security lock for portable electronic devices in accordance with the present invention, showing different operating statuses of the universal security lock.
Figure 17:
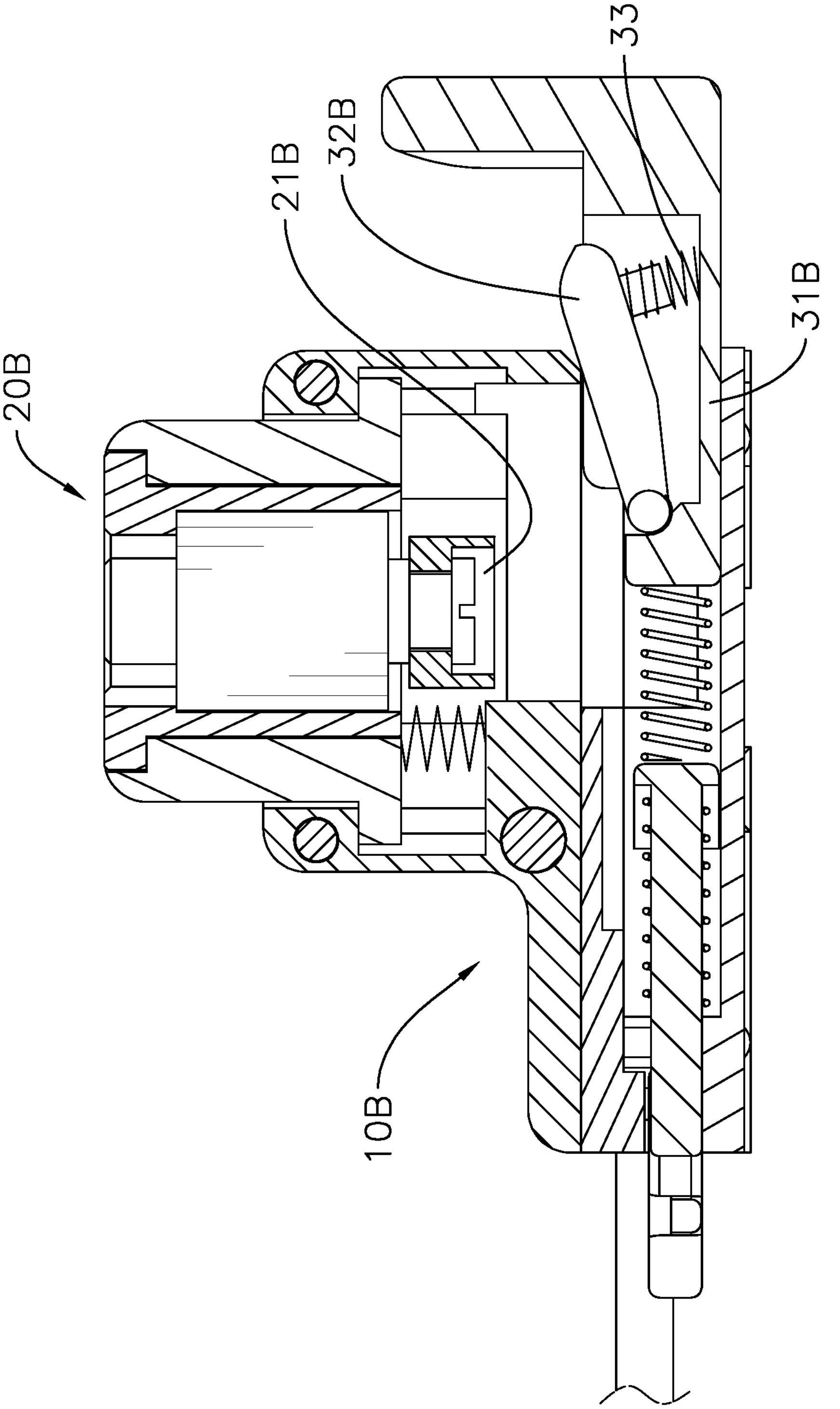

With reference to FIGS. 16 and 17, a third embodiment of the present invention is substantially similar to the first embodiment mentioned above, but the difference is that the lock core 20B is movable upward and downward relative to the base 10B, and the operating part 31B is kept in the engaged position by the base 10B.

The actuating block 21A is rotatable around the center line of the lock core 20B. To return the operating part 31B to the disengaged position, rotate the actuating block 21B to a position above the blocker 32B and then press down the lock core 20A (as shown in FIG. 16). Then, the operating part 31B automatically returns to the disengaged position as shown in FIG. 17. The actuating block 21B in FIG. 17 is moved away from the top of the blocker 32B.

To sum up, the operating part 31 of the operating mechanism 30 drives the expanding rod 50 via the displacement absorber 40, and movement of the expanding rod 50 gradually expands the two electronic-device-engaging portions 60. As a result, when the operating part 31 is moved to the engaged position, the displacement absorber 40 continuously pushes the expanding rod 50 toward the front opening 102 and forces the two electronic-device-engaging portions 65 to expand until the two gripping fingers 60 are stopped by width of the security slot 91. Therefore, the present invention is compatible with security slots 91 of different widths.

In other words, when the operating part 31 is moved to the same engaged position, the two gripping fingers 60 can be expanded to multiple different expanded positions, unlike conventional security lock that can only be expanded to a single expanded position. As a result, the present invention is compatible with security slots 91 of different widths.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A universal security lock for portable electronic devices comprising:

a base having an inner space which extends along an imaginary extension line and forms a front opening and a rear opening; the front opening and the rear opening each disposed on a respective one of two opposite ends of the base;

a lock core mounted on the base and having:

an actuating block movably disposed in the inner space;

an engaging mechanism disposed in the inner space and having an operating part, a blocker, a displacement absorber, an expanding rod, and two gripping fingers; the operating part, the displacement absorber, the expanding rod, and the two gripping fingers disposed along the extension line toward the front opening; wherein the operating part is slidably mounted through the rear opening and is slidable toward the front opening to an engaged position;

the blocker is mounted on the operating part and protrudes from a side, which faces toward the lock core, of the operating part;

the expanding rod is slidably disposed in the inner space and is slidable along the extension line; an end, which is away from the rear opening, of the expanding rod is defined as an abutting end;

the displacement absorber drives the operating part and the expanding rod such that the operating part and the expanding rod tend to move away from each other;

each of the gripping fingers has an inner end located in the inner space and being pivotal relative to the base; each of the two inner ends of the two gripping fingers disposed on a respective one of two opposite sides of the expanding rod;

an outer end protruding from the base via the front opening;

an inner surface facing toward another one of the gripping fingers;

an outer surface being opposite to the inner surface; and an electronic-device-engaging portion protruding from the outer surface and disposed on the outer end;

wherein when the expanding rod is moved toward the front opening, the abutting end of the expanding rod abuts against the two inner surfaces of the two gripping fingers and drives the two electronic-device-engaging portions to move away from each other gradually; and wherein when the operating part is in the engaged position, the displacement absorber pushes the expanding rod toward the front opening such that the two electronic-device-engaging portions of the two gripping fingers are driven to move away from each other; the blocker is disposed in the inner space of the base and abuts against the actuating block of the lock core or an inner wall of the base to keep the operating part in the engaged position; and wherein the two gripping fingers are respectively a first gripping finger and a second gripping finger; the inner surface of the first gripping finger has an opening protrusion protruding thereon; the opening protrusion is disposed closer to the outer end of the first gripping finger than the inner end of the first gripping finger is; the abutting end of the expanding rod selectively abuts against the opening protrusion of the first gripping finger.

2. The universal security lock for the portable electronic devices as claimed in claim 1, wherein the displacement absorber has a resilient element; when the operating part of the engaging mechanism is in the engaged position, resiliency of the resilient element drives the expanding rod and the operating part to move away from each other.

3. The universal security lock for the portable electronic devices as claimed in claim 1, wherein the second gripping finger has a closing recess formed in the inner surface thereof; and when the first gripping finger and the second gripping finger pivot toward each other, the opening protrusion of the first gripping finger is movable into the closing recess of the second gripping finger.

4. The universal security lock for the portable electronic devices as claimed in claim 1, wherein when the operating part of the engaging mechanism is in the engaged position, the actuating block of the lock core is movable to a side, which faces toward the rear opening, of the blocker to keep the operating part in the engaged position, and the actuating block of the lock core is movable away from the blocker such that the operating part is movable away from the front opening to a disengaged position.

5. The universal security lock for the portable electronic devices as claimed in claim 1, wherein the universal security lock further has a returning resilient element; the returning resilient element drives the expanding rod toward the rear opening;

when the operating part is in the engaged position, restoring resilient force of the returning resilient element exerted on the expanding rod is smaller than force of the displacement absorber exerted on the expanding rod; and when the operating part is moved away from the front opening to a disengaged position, the returning resilient element moves the expanding rod toward the rear opening.

6. The universal security lock for the portable electronic devices as claimed in claim 1, wherein a width of the abutting end of the expanding rod gradually increases toward the rear opening.

7. A universal security lock for portable electronic devices comprising:

a base having an inner space which extends along an imaginary extension line and forms a front opening and a rear opening; the front opening and the rear opening each disposed on a respective one of two opposite ends of the base;

a lock core mounted on the base and having:

an actuating block movably disposed in the inner space;

an engaging mechanism disposed in the inner space and having an operating part, a blocker, a displacement absorber, an expanding rod, and two gripping fingers; the operating part, the displacement absorber, the expanding rod, and the two gripping fingers disposed along the extension line toward the front opening; wherein the operating part is slidably mounted through the rear opening and is slidable toward the front opening to an engaged position;

the blocker is mounted on the operating part and protrudes from a side, which faces toward the lock core, of the operating part;

the expanding rod is slidably disposed in the inner space and is slidable along the extension line; an end, which is away from the rear opening, of the expanding rod is defined as an abutting end;

the displacement absorber drives the operating part and the expanding rod such that the operating part and the expanding rod tend to move away from each other;

each of the gripping fingers has an inner end located in the inner space and being pivotal relative to the base; each of the two inner ends of the two gripping fingers disposed on a respective one of two opposite sides of the expanding rod;

an outer end protruding from the base via the front opening;

an inner surface facing toward another one of the gripping fingers;

an outer surface being opposite to the inner surface; and an electronic-device-engaging portion protruding from the outer surface and disposed on the outer end;

wherein when the expanding rod is moved toward the front opening, the abutting end of the expanding rod abuts against the two inner surfaces of the two gripping fingers and drives the two electronic-device-engaging portions to move away from each other gradually; and wherein when the operating part is in the engaged position, the displacement absorber pushes the expanding rod toward the front opening such that the two electronic-device-engaging portions of the two gripping fingers are driven to move away from each other; the blocker is disposed in the inner space of the base and abuts against the actuating block of the lock core or an inner wall of the base to keep the operating part in the engaged position;

wherein the displacement absorber has two magnetic elements; the two magnetic elements repel each other, and repulsion between the two magnetic elements drives the operating part and the expanding rod to move away from each other.

8. The universal security lock for the portable electronic devices as claimed in claim 3, wherein the two gripping fingers are respectively a first gripping finger and a second gripping finger;

the inner surface of the first gripping finger has an opening protrusion protruding thereon; the opening protrusion is disposed closer to the outer end of the first gripping finger than the inner end of the first gripping finger is; and the abutting end of the expanding rod selectively abuts against the opening protrusion of the first gripping finger.

9. The universal security lock for the portable electronic devices as claimed in claim 5, wherein the second gripping finger has a closing recess formed in the inner surface thereof; and when the first gripping finger and the second gripping finger pivot toward each other, the opening protrusion of the first gripping finger is movable into the closing recess of the second gripping finger.

10. The universal security lock for the portable electronic devices as claimed in claim 9, wherein when the operating part of the engaging mechanism is in the engaged position, the actuating block of the lock core is movable to a side, which faces toward the rear opening, of the blocker to keep the operating part in the engaged position, and the actuating block of the lock core is movable away from the blocker such that the operating part is movable away from the front opening to a disengaged position.

11. The universal security lock for the portable electronic devices as claimed in claim 10, wherein the operating part of the engaging mechanism has an accommodating recess which is open toward the lock core; and the blocker of the engaging mechanism selectively retracts into or protrudes from the accommodating recess; the blocker tends to protrude from the accommodating recess.

12. The universal security lock for the portable electronic devices as claimed in claim 11, wherein the blocker of the engaging mechanism is elongated; two opposite ends of the blocker are respectively a first end and a second end; the first end is disposed toward the front opening, pivotally mounted to the operating part, and disposed in the accommodating recess; and the engaging mechanism further has a blocker resilient element connected to the blocker such that the second end of the blocker tends to protrude from the accommodating recess.

13. The universal security lock for the portable electronic devices as claimed in claim 12, wherein when the operating part of the engaging mechanism is in the engaged position, the blocker selectively protrudes from the accommodating recess and abuts against the inner wall of the base to keep the operating part in the engaged position; and the actuating block of the lock core is selectively movable toward the blocker such that the blocker is retracted in the accommodating recess, allowing the operating part to move away from the front opening to a disengaged position.

14. The universal security lock for the portable electronic devices as claimed in claim 13, wherein the universal security lock further has a returning resilient element; the returning resilient element drives the expanding rod toward the rear opening;

when the operating part is in the engaged position, restoring resilient force of the returning resilient element exerted on the expanding rod is smaller than the force of the displacement absorber; and when the operating part is moved away from the front opening to the disengaged position, the returning resilient element moves the expanding rod toward the rear opening.

15. The universal security lock for the portable electronic devices as claimed in claim 14, wherein a width of the abutting end of the expanding rod gradually increases toward the rear opening.

16. A universal security lock for portable electronic devices comprising:

a base having an inner space which extends along an imaginary extension line and forms a front opening and a rear opening; the front opening and the rear opening each disposed on a respective one of two opposite ends of the base;

a lock core mounted on the base and having:

an actuating block movably disposed in the inner space;

an engaging mechanism disposed in the inner space and having an operating part, a blocker, a displacement absorber, an expanding rod, and two gripping fingers; the operating part, the displacement absorber, the expanding rod, and the two gripping fingers disposed along the extension line toward the front opening; wherein the operating part is slidably mounted through the rear opening and is slidable toward the front opening to an engaged position;

the blocker is mounted on the operating part and protrudes from a side, which faces toward the lock core, of the operating part;

the expanding rod is slidably disposed in the inner space and is slidable along the extension line; an end, which is away from the rear opening, of the expanding rod is defined as an abutting end;

the displacement absorber drives the operating part and the expanding rod such that the operating part and the expanding rod tend to move away from each other;

each of the gripping fingers has an inner end located in the inner space and being pivotal relative to the base; each of the two inner ends of the two gripping fingers disposed on a respective one of two opposite sides of the expanding rod;

an outer end protruding from the base via the front opening;

an inner surface facing toward another one of the gripping fingers;

an outer surface being opposite to the inner surface; and an electronic-device-engaging portion protruding from the outer surface and disposed on the outer end;

wherein when the expanding rod is moved toward the front opening, the abutting end of the expanding rod abuts against the two inner surfaces of the two gripping fingers and drives the two electronic-device-engaging portions to move away from each other gradually; and wherein when the operating part is in the engaged position, the displacement absorber pushes the expanding rod toward the front opening such that the two electronic-device-engaging portions of the two gripping fingers are driven to move away from each other; the blocker is disposed in the inner space of the base and abuts against the actuating block of the lock core or an inner wall of the base to keep the operating part in the engaged position;

wherein the operating part of the engaging mechanism has an accommodating recess which is open toward the lock core; and the blocker of the engaging mechanism selectively retracts into or protrudes from the accommodating recess; the blocker tends to protrude from the accommodating recess.

17. The universal security lock for the portable electronic devices as claimed in claim 16, wherein the blocker of the engaging mechanism is elongated; two opposite ends of the blocker are respectively a first end and a second end; the first end is disposed toward the front opening, pivotally mounted to the operating part, and disposed in the accommodating recess; and the engaging mechanism further has a blocker resilient element connected to the blocker such that the second end of the blocker tends to protrude from the accommodating recess.

18. The universal security lock for the portable electronic devices as claimed in claim 16, wherein when the operating part of the engaging mechanism is in the engaged position, the blocker selectively protrudes from the accommodating recess and abuts against the inner wall of the base to keep the operating part in the engaged position; and the actuating block of the lock core is selectively movable toward the blocker such that the blocker is retracted in the accommodating recess, allowing the operating part to move away from the front opening to a disengaged position.

* * * * *